Patented Jan. 2, 1945

2,366,611

UNITED STATES PATENT OFFICE 2,366,611

DIOXANE DERIVATIVES AND A PROCESS FOR MAKING SAME

Adolf Grün, Basel, Switzerland, assignor to J. R. Geigy A. G., Basel, Switzerland, a Swiss company No Drawing. Application February 4, 1943, Serial No. 474,725. In Switzerland January 5, 1942

3 Claims. (Cl. 260—247)

Among the derivatives of the arylene dioxanes only the benzo-1:4-dioxane substituted in the heteroring have become known hitherto, while derivatives thereof substituted in the aromatic nucleus in 0-position to one of the 2-oxygen atoms of the dioxane ring were not yet accessible. It has now been found that these compounds are obtained by causing epihalogenhydrines to react with alkaline solutions of polyvalent phenols containing two hydroxyl groups in ortho-position and at least a third substituent or an annulated ring. When working in this manner, 2-hydroxymethyl-benzodioxanes or -naphthodioxanes respectively and the like are obtained which are substituted in the aromatic nucleus. From these compounds further derivatives may be obtained especially by replacing the hydroxyl groups in 2-position by a halogen atom and by changing the halogen by an amino group and the like.

As substituents in the nucleus come into question: alkyl, alkoxy, carboxy, carbalkoxy, aminoalkyl or alkylamino groups. These compounds also react readily, when the same or their alkali compounds are caused, even without furnishing any heat, to react with an epihalogenhydrine, and give the corresponding arylene-1:4-dioxane compounds in very good yields.

It is surprising that in all cases, even under the mildest conditions, ring-closure takes place thus giving the benzodioxane compound, while this reaction has only been observed hitherto for the pyrocatechine (and this only when working under stronger reaction conditions) so that this reaction has been considered to a certain extent as specific for this compound. Besides, most of the o-diphenols suitably substituted and required as starting or intermediate products respectively have not yet been known.

The compounds prepared according to the present invention have proved without exception to be physiologically active substances being more active than the analogous compounds which are not substituted in the benzene nucleus. The suitably substituted compounds such as the hydroxyl and amino derivatives also offer the advantage that they may be further derived, e. g. acylated, which fact is often important for the gradation of the effects. The new products may be used as therapeutics or as therapeutical intermediates in the pharmaceutical-chemical industry.

This application contains subject matter related to that disclosed in Grün application 474,874 filed February 5, 1943.

The present invention is illustrated, but not limited, by the following examples, wherein the parts are by weight.

Example 1

100 parts of the o-methylpyrocatechine, B. P.$_{12\,mm.}$ 127° C., are cold dissolved in 400 parts of 2-n caustic potash lye and then stirred with 100 parts of glycerine-epichlorhydrine under a feeble temporary self-heating of the mixture. The latter is shaken still for 20 hours, then the product thus precipitated from the aqueous solution is separated and the latter extracted; the extract is now combined with the main quantity, whereupon the unconsumed epichlorhydrine still present in the mixture is distilled off in a vacuo on the water-bath and regenerated. Thus 85–88 parts of 2-hydroxymethyl-o-methyl-benzodioxane remain which may be obtained in a pure form as colorless liquid by distillation. Its boiling point at a pressure of 1 mm. is 129°–130° C.

80 parts of this hydroxymethyl compound are mixed with 35 parts of pyridine, then, under cooling with ice, 55 parts of thionylchloride are allowed to slowly drop thereinto and, after a long standing, the mixture is heated on the water-bath during a short time. The whole mixture is now poured into ice-water and the product possibly diluted by means of ether or of the like is decanted, freed from acid by washing with water, dried and distilled. About 75 parts of 2-chloromethyl-o-methylbenzodioxane, a viscous liquid, are obtained; boiling point at 13 mm. pressure 137° C.

70 parts of this chlorine derivative are heated to 150° C. for 8 hours under pressure together with 62 parts of morpholine. (Instead of the chlorine derivative 86 parts of the analogous bromine derivative may be used.) After cooling, the liquid reaction product which has been diluted with ether or the like is separated by suction from the precipitated morpholine hydrochloride and taken up into sulfuric acid 1:4. The sulfate solution is made alkaline after purification by shaking with water and the base thus precipitated, about 75 parts, combined, dried and distilled. The resultant 2-morpholinylmethyl-o-methylbenzodioxane of the formula

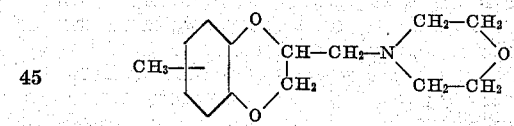

is liquid, colorless and odorless, B. P.$_{0.55\,mm.}$ 141° C.; 1 g. consumes 40.4 ccm. n/10 acid, calculated 40.1 ccm., for the neutralisation against methylorange. The salts are easily soluble in water reacting acid to litmus. The hydrochloride constitutes white crystals, M. P. 200° C.

The starting product is prepared by reducing o-vanilline by means of tin and hydrochloric acid or by catalytic hydrogenation into the o-methylguaiacol, B. P.$_{13\,mm.}$ 95° C., M. P. 45.5° C., which is then demethylated by heating it with concentrated hydrobromic acid or also with hydrochloric acid in the presence of a tertiary base. From vanilline there is obtained in this manner the 1-methyl-3:4-dihydroxybenzene and therefrom according to the above described process an isomeric methylhydroxymethyl-benzodioxane.

Starting from ethylpyrocatechine, allylpyrocatechine or propenylpyrocatechine, the reaction takes place in an analogous manner leading to products with quite similar properties.

Example 2

100 parts of 1-propyl-3:4-dihydroxybenzene, M. P. 55° C., B. P.$_{0.2\,mm.}$ 111°–112° C., are dissolved in 330 parts of 2n-caustic potash lye while adding a little quantity of ice. This solution is mixed with 80 parts of epichlorhydrine, whereupon, within a short time, a strong self-heating takes place. After cooling this mixture, it is shaken for 30 hours, the raw product separated out as a heavy oil is washed with water, dried and purified by distillation after having removed the unconsumed epichlorhydrine. 84 parts of the 2-hydroxymethylpropylbenzodioxane so obtained, B. P.$_{0.2\,mm.}$ 142°–143° C., are treated in 42 parts of pyridine with 56 parts of thionylchloride thus giving 88 parts of the raw chlorine derivative. After purification by distillation this product has a boiling point of 126°–127° C. at a pressure of 0.2 mm.

66 parts of this chlorine compound are autoclaved at 140°–150° C. for 10 hours with 51 parts of morpholine. The raw product sucked off from the precipitated morpholine hydrochloride is freed in sulfuric acid solution from the neutral substance still present, then, after reprecipitation, washed with caustic potash lye, dried, dissolved in ether and the hydrochloride precipitated by methyl-alcoholic hydrochloric acid. It forms snow-white, little crystals which are very easily soluble in water; M. P. 224° C.

The propyl-dihydroxybenzene is obtained by catalytic hydrogenation of isoeugenol into dihydro-iso-eugenol, B. P.$_{13\,mm.}$ 124°–125° C., which is further demethylated by means of hydrobromic acid.

Example 3 o-Vanilline dissolved in the equimolecular quantity of a normal base is converted by means of diluted hydrogen peroxide solution into the pyrogallol-1-methyl ether, B. P.$_{13\,mm.}$ 133° C., M. P. 40° C.

100 parts of this methyl ether are dissolved, in the absence of aerial oxygen, in 178 part of 4n-caustic potash lye and shaken with 87 parts of epichlorhydrine. After a short time and under a strong self-heating brightening and turbidity of the solution take place. The solution is still shaken for 30 hours, then the precipitated raw product is separated from this solution, the latter is extracted, the extract combined with the main quantity and 102 parts of 2-hydroxymethyl-o-methoxybenzodioxane are isolated by distillation; B. P. $_{0.4\,mm.}$ 155°–156° C.; hydroxyl number 281 (calculated 286). By treating it with thionylchloride in the presence of a sufficient quantity of pyridine there results in a very good yield the chloromethyl derivative, B. P.$_{0.3\,mm.}$ 133°–134° C.

From this product there is obtained in yields of at least 90% the 2-morpholinylmethyl-o-methoxybenzo-dioxane by heating the said product for 10 hours at 140°–150° C. with the double equimolecular quantity of morpholine, separating the free base and purifying in the usual manner. The melting point of the 2-morpholinyl-methyl-o-methoxybenzodioxane is 80° C., while the boiling point at a pressure of 0.2 mm. is 167°–168° C.; as a monoacid base this compound may be titrated and consumes with regard to methylorange for each 1 g. 38.1 ccm. of n/10 acid (calculated 37.7 ccm.); it forms readily soluble salts which are partially hydrolysed in solution. The hydrochloride melts at 102° C. under decomposition.

When starting from the corresponding pyrogallol derivatives, e. g. pyrogallol-1-ethyl ether, there are obtained in the same manner the corresponding alkoxy-benzodioxanes.

Instead of the methoxy-pyrocatechine there may be used quite well pyrocatechine-o-carboxylic acid, protocatechuic acid or their methyl and ethyl esters.

Example 4

The 2-chloromethyl-o-methoxy-benzodioxane obtained as intermediate product according to Example 3 is heated in the autoclave for 8 hours to 125°–130° C. with the same volume of tetraline and with an excess of diethylamine and the product isolated as above described. Thus there is obtained in a good yield 2-diethylamino-methyl-o-methoxybenzodioxane; B. P.$_{0.5\,mm.}$ 142° C. 1 g. consumes 40.0 ccm. of n/10 acid, calculated 39.8 ccm. The base gives very hygroscopic salts with the usual mineral acids and carboxylic acids.

By replacing diethylamine by another secondary amine, such as piperidine, tetrahydroquinoline or -iso-quinoline and working under the same reaction conditions, the corresponding 2 - alkylaminomethyl - o - methoxy - benzodioxane derivatives are formed.

Example 5

100 parts of 2-chloromethyl-o-methoxybenzo-dioxane are heated in the autoclave for 8 hours to 130°–140° C. with 75 parts of n-butylamine. Then the reaction product is separated from the butylamine hydrochloride by washing the same and purified over the sulfate, whereupon the base is set free and purified by distillation. Thus 110 parts, i. e. 94% of the theory of 2-butylamino-methyl-o-methoxy-benzodioxane are obtained in a liquid form; B. P.$_{0.4\,mm.}$ 156°–157° C.; 1 g. of the base consumes for the neutralisation 40.1 ccm. of n/10 acid, calculated 39.8 ccm. The salts are easily soluble, scarcely hygroscopic. The melting point of the hydrochloride is 186° C. (it sinters above 160° C.).

The homologous compounds up to stearylamine react like butylamine with 2-chloromethyl-o-methoxy-benzodioxane as well as with other 2-chloromethyldioxanes without prejudice to the substitution of the aryl.

Example 6

10 parts of the hydrochloride prepared according to Example 5 are used and the base is set free and dissolved in benzene. The dried solution is treated with 4.6 parts of finely powdered calcinated sodium carbonate, heated to 50° C. and then, while stirring, 4.6 parts of deacidified dimethylsulfate are allowed to slowly drop thereinto, while the temperature is gradually increased to 60° C. Stirring is continued for a further hour at 70°–80° C., the mixture is allowed to cool down, stirred with about 10 parts of water and the base extracted by means of sulfuric acid 1:4. After reprecipitation and purification by distillation 9 parts of the tertiary base of the formula

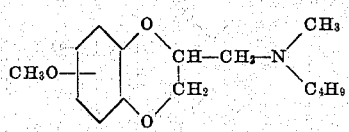

are obtained as a colorless and odorless oil; B. P. $_{0.3\text{ mm}}$ 149° C. 1 g. consumes 38.0 ccm. of n/10 acid, calculated 37.7 ccm. Contrarily to the salts of the secondary base the salts of the tertiary base are extremely hygroscopic.

By the same treatment of the secondary base with diethylsulfate there is obtained the corresponding ethylbutylamino compound.

Example 7

100 parts of 2:3-dihydroxynaphthalene are dissolved in 41 parts of potassium hydroxide and 250 parts of water, treated with 78 parts of epichlorhydrine and shaken for 20 hours. The solid raw product thus precipitated is purified by digesting the same first with hot water, then with a diluted base and finally again with water until the color reaction with ferric chloride has disappeared. It is now dissolved in benzene, dried and recrystallised. Thus the 2-hydroxymethyl-naphthodioxane is obtained in form of pure white crystals; M. P. 162° C., hydroxyl number 258 (calculated 259).

For the conversion into the chlorine compound 30 parts of this product are dissolved in 45 parts of pyridine and treated with 16.5 parts of thionylchloride, whereupon, by the usual working up, there are obtained 28 parts, i. e. 86% of the theory of the chlorine compound in form of white crystals having a melting point of 68° C.

25 parts of the chlorine compound are heated for 8–10 hours to 150° C. with 18 parts of morpholine. The solid reaction product is dissolved on the water-bath in 200 parts of n-hydrochloric acid; then the hydrochloride which crystallises out on cooling is separated, purified by recrystallisation from hot water and finally the base is precipitated from the cold solution and crystallised from methanol. The 2-morpholinylmethylnaphthodioxane so-obtained with a yield of 70–80% shows the melting point of 116° C. (1 g. consumes 35.6 ccm. of n/10 acid, calculated 35.1 ccm.); its hydrochloride melts at 240° C.

Like 2:3-dihydroxynaphthalene, other o-dihydroxynaphthalenes, dihydroxyanthracenes and so on as well as their derivatives with free hydroxyl groups, such as dihydroxyanthraquinones, react in an alkaline solution with epihalogenhydrines thus forming the dioxane ring.

Example 8

2-hydroxymethylnaphthodioxane produced according to Example 7 is dissolved in about the tenfold quantity of alcohol and this solution, after the addition of 2% of Raney-nickel, is treated at 120° C. under a pressure of 100 atmospheres with hydrogen, whereby for 100 g. of the substance about 202 litres of hydrogen are absorbed (for the absorption of 2 molecules of the substance the calculated quantity of hydrogen amounts to 208.3 litres). Now the alcohol is expelled from the reaction solution which was purified by means of silicagel. The 2-hydroxymethyl-tetrahydronaphthobenzodioxane remains as a highly viscous mass which crystalises out after a longer standing. By the interchange of the hydroxyl group by a chlorine atom taking place, as usual, by means of thionylchloride and pyridine there results with a good yield the chlorine derivative, B. P.$_{0.22\text{ mm}}$ 142°–143° C., M. P. 61° C. This compound is autoclaved for 10 hours at 140°–150° C. with about the same quantity by weight of morpholine and with some drops of water, then the base is, as usual, isolated and converted by stirring in the heat with 2n-hydrochloric acid into the 2-morpholinylmethyl-tetrahydronaphthodioxane hydrochloride which is obtained with a yield of 85% of the theory. Melting point (under swelling up) 265° C. Hydrochloric acid content 10.9%, calculated 11.0%.

Example 9

2-morpholinylmethyl-o-methoxybenzodioxane, made according to Example 3, is maintained at the boiling under reflux with the double quantity of 45 per cent by weight of hydrobromic acid, whereby the temperature of the solution rises to 116°–118° C. After 3 hours the separation of white crystals begins. Boiling is continued until the separation does no more noticeably increase. Now the mixture is first cooled with water, then with ice, the crystal paste is filtered by suction and washed with acetone. From the 2-morpholinylmethyl-o-hydroxybenzodioxane hydrobromide, whose melting point (when recrystallised from water) is 274°–275° C., there is obtained with a good yield by means of dicarbonate the free amino phenol of the formula

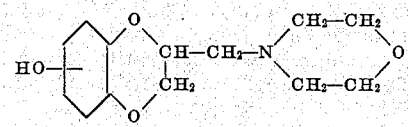

white crystals; M. P. 84°–85° C., soluble in acids and bases.

The preparation of the compound from pyrogallol and epichlorhydrine by reaction in an alkaline solution, changing the alcoholic hydroxyl group in the resulting hydroxymethyl-hydroxybenzodioxane into chlorine and then replacing the chlorine atom by the morpholine radical offers no advantage, but requires by far much more precautionary measures.

Example 10

43 parts of morpholine dissolved in 200 ccm. methanol are treated with 45 parts of a 29% formaldehyde solution. The solution is allowed to stand until the odor of the aldehyde has nearly disappeared, so that the formation of hydroxymethylmorpholine has practically completed. Now 55 parts of pyrocatechine are added thereto in the absence of air, the mixture is allowed to stand for one day, heated for 4 hours to 100° C. in a closed vessel and finally the methanol is distilled off. To the remaining aqueous solution of morpholinylmethyldihydroxybenzene there are added, in the absence of air 31.5 parts of potassium hydroxide dissolved in 150 parts of water and then 70 parts of epichlorhydrine. The solution being initially brownish-black brightens on shaking and the resulting benzodioxane compound is partly precipitated in a crystalline form. It is separated from the solution which is then extracted. The collected raw product is now dissolved in diluted sulfuric acid, and the base is precipitated from the purified sulfate solution and diluted with a solvent such as ether, whereupon the solution is washed with a diluted base and water, concentrated and the residue distilled off. The 2-hydroxymethyl-ar-morpholinylmethyl benzodioxane (ar-substituted in the aromatic nucleus)

is thus obtained as a colorless, highly viscous liquid (becoming glassy in the cold); B. P.$_{0.3}$ mm. 189°–190° C. 1 g. consumes for the neutralisation 38.8 ccm. of n/10 acid, calculated 39.8 ccm. Instead of hydroxymethylmorpholine can be used with similar effect hydroxymethyldimethylamine or hydroxymethyldiethylamine.

*Example 11*

2'- morpholinylmethyl - o - hydroxybenzodioxane, made according to Example 9, is intermixed with acetic acid anhydride in the ratio 2:1 and this solution first heated for several hours up to about 100° C. and then, after the addition of anhydride, still heated for some time to boiling. Acetic acid as well as exceeding anhydride are removed under reduced pressure, the remaining raw product is dissolved in dilute mineral acid, the solution purified by shaking out the same with an organic solvent and made alkaline in the cold. The 2'-morpholinylmethyl-o-acetoxybenzodioxane thus precipitated is collected and the rather little quantity of unchanged free phenol base recovered from the alkaline solution by acidification and precipitation with bicarbonate. The acetyl derivative forms a viscous, bright yellow liquid which is insoluble in cold bases, but soluble on heating under saponification. It is easily and clearly soluble in acids. 1 g. consumes for the neutralisation 34.0 ccm. of n/10 acid, calculated 34.1 ccm. The hydrochloride is a white crystal meal which is easily soluble in water (contrarily to the hydrochloride of the phenol base) and melts at 233°–234° C.

The claims hereunto appended are directed to presently-preferred process and products.

What I claim is:

1. Process for the manufacture of methyl substitution derivatives of 2-methyl-benzodioxane which comprises condensing in caustic alkaline medium ortho-methylpyrocatechine of the formula

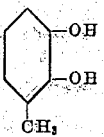

with an epihalogenhydrine of glycerine to form a product of the formula

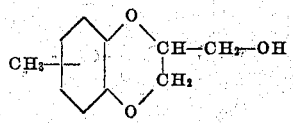

substituting the ω-hydroxy group by a halogen atom and replacing this by the morpholine radical, whereby the compound of the formula

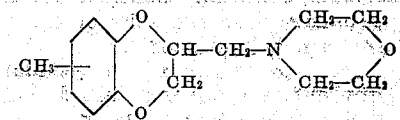

is formed, wherein the nuclear methyl group stands in ortho position to one of the oxygen atoms.

2. The benzo-dioxane derivatives of the general formula

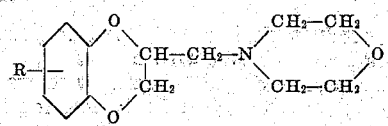

wherein R is situated in o-position to one of the 2 oxygen atoms and means a member selected from the group consisting of hydroxy, alkoxy, alkyl, carboxy, carboalkoxy, aminoalkyl, alkylamino groups and annulated rings being colorless compounds of valuable therapeutic properties.

3. The benzo-dioxane derivative of the formula

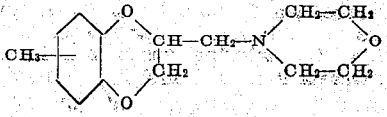

wherein CH$_3$ is situated in o-position to one of the 2 oxygen atoms, being a colorless and tasteless compounds of valuable therapeutic properties, mm. pressure forming water-soluble salts with acids and possessing valuable therapeutic properties.

ADOLF GRÜN.